US012623938B2

(12) United States Patent
Elger et al.

(10) Patent No.: US 12,623,938 B2
(45) Date of Patent: *May 12, 2026

(54) SYSTEMS AND METHODS FOR CREATING AND SEGMENTING TREATMENT PROCESSES

(71) Applicant: ENVIROMIX, INC, Charleston, SC (US)

(72) Inventors: Sarah O. Elger, Cudahy, WI (US); David D. Lauer, Germantown, WI (US); John Edward Koch, III, Wauwatosa, WI (US)

(73) Assignee: Enviromix, Inc, Charleston, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,847

(22) Filed: Apr. 18, 2024

(65) Prior Publication Data

US 2024/0262725 A1 Aug. 8, 2024

Related U.S. Application Data

(63) Continuation of application No. 17/394,716, filed on Aug. 5, 2021, now Pat. No. 11,993,524.

(51) Int. Cl.
*C02F 3/00* (2023.01)
*C02F 3/12* (2023.01)
(Continued)

(52) U.S. Cl.
CPC ............ *C02F 3/006* (2013.01); *C02F 3/1284* (2013.01); *C02F 3/20* (2013.01); *C02F 3/301* (2013.01);
(Continued)

(58) Field of Classification Search
CPC .......... C02F 3/006; C02F 3/1284; C02F 3/20; C02F 3/301; C02F 2209/14; C02F 2209/15; C02F 2209/18; C02F 2209/40; C02F 2209/44; C02F 3/1236; C02F 3/302; C02F 2209/005; C02F 2209/16; C02F 2209/38; Y02W 10/10
(Continued)

(56) References Cited

U.S. PATENT DOCUMENTS 7,011,757 B1 3/2006 Reid
7,854,843 B2 12/2010 Pehrson et al.
(Continued)

FOREIGN PATENT DOCUMENTS

SK 500412015 11/2015

OTHER PUBLICATIONS

Ovivo Carrousel Brochure accessed at https://ovivo.getbynder.com/m/56d907ea2c275950/original/Carrousel-Brochure-0219-WEB.pdf published Apr. 2, 2019.
(Continued)

*Primary Examiner* — Ekandra S. Miller-Cruz
(74) *Attorney, Agent, or Firm* — Nelson Mullins Riley & Scarborough LLP; Ashley B. Summer, Esq.

(57) ABSTRACT

Systems and methods for enabling dynamic volumetric transitioning and segmentation of treatment conditions are disclosed. Such treatment conditions may include, by way of example, systems and methods for dynamically transitioning treatment environments within a reactor for activated sludge treatment processes. Such environments may include anaerobic, anoxic, fermentation, suboxic, and aerobic environments.

20 Claims, 13 Drawing Sheets

(51) Int. Cl.
  C02F 3/20 (2023.01)
  C02F 3/30 (2023.01)

(52) U.S. Cl.
  CPC ...... *C02F 2209/14* (2013.01); *C02F 2209/15*
      (2013.01); *C02F 2209/18* (2013.01); *C02F*
      *2209/40* (2013.01); *C02F 2209/44* (2013.01)

(58) Field of Classification Search
  USPC ........................................................ 210/614
  See application file for complete search history.

(56) References Cited

U.S. PATENT DOCUMENTS

| | | | |
|---|---|---|---|
| 8,323,498 | B2 | 12/2012 | Jenkins et al. |
| 8,505,881 | B2 | 8/2013 | Locklair et al. |
| 2014/0138308 | A1 | 5/2014 | Elger et al. |

OTHER PUBLICATIONS

The Orbal System For Biological Treatment Brochure accessed at https://www.evoqua.com/siteassets/documents/products/aerobic/bc-orbal-br-0220.pdf published Mar. 6, 2021.
AquaSBR Brochure accessed at https://aqua-aerobic.com/downloads/AquaSBR_BROCHURE_web.pdf published Apr. 8, 2022.
https://aqua-aerobic.com/biological/activated-sludge/aqua-mixair/ published Apr. 28, 2019.
Kondo, Sam Bio-P Renovation in the aeration tank at Milwaukee Metropolitan Sewerage Distrcit (MMSD), Starbust Tevhnology LLC newsletter, vol. 1, Jun. 28, 2015.
https://aqua-aerobic.com/biological/activated-sludge/aquasbr/ downloaded from internet archive (www.archive.org) as dated Apr. 14, 2021.

1

SYSTEMS AND METHODS FOR CREATING AND SEGMENTING TREATMENT PROCESSES

CROSS-REFERENCE TO RELATED APPLICATION

This application is a continuation of U.S. application Ser. No. 17/394,716, filed Aug. 5, 2021, which is hereby incorporated by reference in its entirety.

FIELD OF THE INVENTION

The present invention relates to systems and methods for enabling dynamic transitioning and segmentation of volumes within a treatment environment with a reactor or containment unit. Such treatment environments may include, by way of example, anaerobic, anoxic, aerobic environments and any combinations thereof.

BACKGROUND

Methods for creating discrete anaerobic, anoxic, and aerobic environments are known in the art. Such methods may include reactor volumes fixed by temporary or permanent walls, baffles, barriers, or curtains including the operation of independent mixing and aeration equipment or aerated mixing equipment.

SUMMARY OF THE INVENTION

The present invention includes systems and methods as described herein.

In one embodiment, the present invention includes a system for a treatment process of wastewater. The system may include a reactor unit having a volume, a plurality of mixing devices disposed within the reactor, a plurality of aerators disposed within the reactor, and one or more controllers for selectively controlling the mixing devices and the aerators. In addition, the system includes a plurality of sub-volumes within the reactor unit wherein each sub-volume includes at least one of (i) one or more of the plurality mixing devices of the plurality of mixing, and (ii) one or more aerators of the plurality of aerators. Within the system, at least one of the plurality of sub-volumes constitutes a flexible environment configured to dynamically transition some or all of that volume between two or more of anaerobic, anoxic, fermentation, suboxic, and aerobic environments.

In another embodiment, the present invention includes a control system for wastewater treatment systems comprising a plurality of environments within a reactor having a volume of wastewater. In such embodiments, the controller is configured to activate and deactivate a first set of mixing devices positioned within a first sub-volume of wastewater and to activate and deactivate a first set of aerators positioned within the first sub-volume of wastewater so as to provide a first environment within the first sub-volume of wastewater. The first environment may be a fermentation, suboxic, aerobic, anoxic, or anaerobic environment. In addition, the controller is configured to activate and deactivate the first set of mixing devices and the first set of aerators so as to dynamically transition at least a portion of the first sub-volume of wastewater from the first environment to a distinct second environment, wherein the second environment is a fermentation, suboxic, aerobic, anoxic, or anaerobic environment. The controller also is configured to control one or more additional sets of mixing devices and/or one or more additional sets of aerators positioned within one or more additional sub-volumes of wastewater. Such additional sets of mixing devices and additional sets of aerators may be activated and deactivated separately from the first set of mixing devices and the first set of aerators to provide one or more fermentation, suboxic, aerobic, anoxic, or anaerobic environments within the additional sub-volumes.

In one embodiment, the present invention includes a method for treating wastewater within a reactor unit containing a volume of the wastewater wherein the reactor includes a first set of a plurality of mixing devices and a first set of a plurality of aerators. The method includes selectively activating and deactivating a first set of the plurality mixing devices positioned within a first sub-volume of wastewater in the reactor and also selectively activating and deactivating a first set of the plurality of aerators positioned within the first sub-volume of wastewater in the reactor. The selective activation and deactivation of the first set of the plurality mixing devices and the first set of the plurality of aerators disposed within the first sub-volume of wastewater in the reactor is independent of any activation or deactivation of the plurality of mixing devices and the plurality of aerators positioned within other sub-volumes of the reactor. In addition, the first set of the plurality mixing devices and the first set of aeration devices are activated and deactivated to provide a dynamic transition of the environment of the first sub-volume from a fermentation, suboxic, aerobic, anoxic, or anaerobic environments to a distinct environment selected from one the group consisting of a fermentation, suboxic, aerobic, anoxic, and anaerobic environments.

The present invention may be better understood by reference to the description and figures that follow. It is to be understood that the invention is not limited in its application to the specific details as set forth in the following description and figures. The invention is capable of other embodiments and of being practiced or carried out in various ways.

BRIEF DESCRIPTION OF THE DRAWINGS

These and other features, aspects, and advantages of the present invention are better understood when the following detailed description is read with reference to the accompanying drawings, wherein:

FIG. 1D is an alternative embodiment of the reactor shown in FIG. 1A wherein the reactors include barriers; and.

Figure 1A:
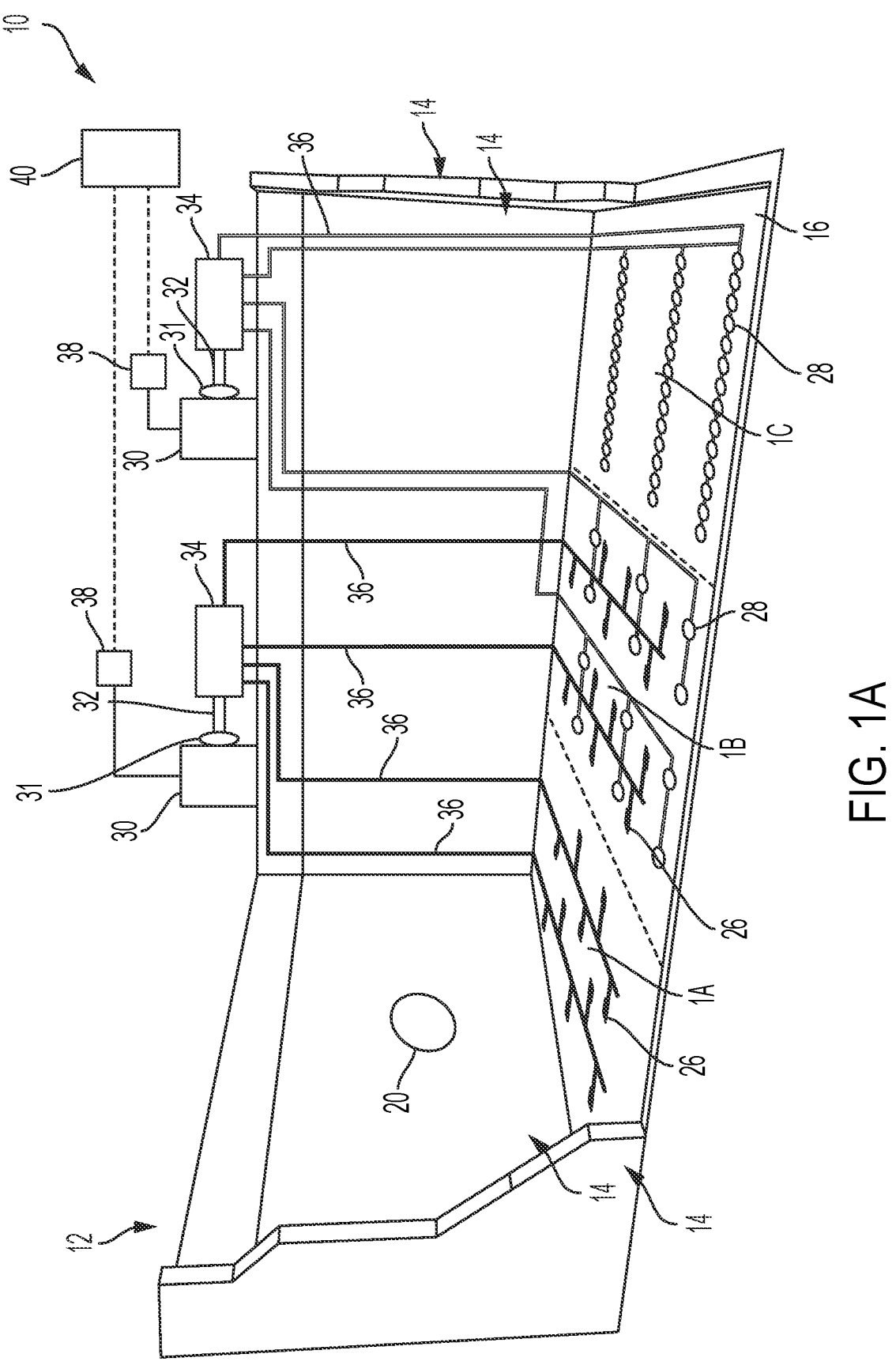
FIG. 1A illustrates a wastewater treatment system including a reactor having dynamically transitioning flexible environments in conjunction with an embodiment of the present invention.

Repeat use of reference characters in the present specification and drawings is intended to represent same or analogous features or elements of the invention. Dashed lines in the figures and shading are non-structural indications to illustrate and demarcate the representative area or volume containing different environments within a system pursuant to embodiments of the present invention.

DETAILED DESCRIPTION OF EXEMPLARY EMBODIMENTS

Reference will now be made in detail to various embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Systems and methods of the present invention may be used in connection with various treatments or storage of substances. By way of example, the embodiments of the present invention may be utilized in the treatment of a substance, such as wastewater. In some embodiments, the present invention may include a reactor containing a volume of substance, such as wastewater, and the reactor can dynamically transition that entire volume or fractions of that volume to anaerobic, anoxic, or aerobic environments or a combination thereof to address real-time conditions or based on other settings or parameters. One of ordinary skill in the art will appreciate that while treatment conditions may be changed instantaneously, or nearly instantaneously, the conditions of the wastewater within the volume of the environment may require some lag time to transition.

By way of example, embodiments of the present invention may include systems and methods for biological wastewater treatment processes, such as suspended growth (for example, activated sludge) and fixed film processes, or a combination of said processes. In such processes, a containment unit or multiple containment units may be utilized to provide multiple environments, such as anaerobic, fermentation, anoxic, and/or aerobic environments, for respective volumes of the wastewater undergoing treatment. Such different environments may mix the activated sludge and/or provide oxygen for the removal of organic material and nutrients such as various species of phosphorous, and/or nitrogen. As used herein, an anaerobic environment includes a volume defined by an environment within the reactor that is void of both chemically bound oxygen, such as nitrate-nitrogen ($NO_3$—N), and dissolved oxygen. Anaerobic environments may be utilized as a step in biological phosphorus removal, forcing the release of phosphorus from the biomass cells (activated sludge) in exchange for volatile fatty acids. A fermentation environment includes a volume defined by an anaerobic environment where the primary solids, primary effluent, mixed liquor suspended solids, influent wastewater suspended solids, return activated sludge solids, or some combination thereof are allowed to stratify within an environment to promote hydrolysis and fermentation of readily biodegradable material to produce volatile fatty acids. An anoxic environment includes a volume defined by an environment within the reactor that is void of dissolved oxygen but contains chemically bound oxygen such as nitrate-nitrogen ($NO_3$—N). Anoxic environments may be used for a denitrification process to remove nitrate. An aerobic environment includes a volume defined by an environment within the reactor that may have both dissolved oxygen and chemically bound oxygen such as nitrate-nitrogen ($NO_3$—N) present. Aerobic environments may be used to remove organic material and to convert ammonia to nitrate.

Embodiments of the present invention may be utilized to treat a substance, such as biological wastewater treatment processes, including suspended growth (for example, activated sludge) and fixed film processes, or a combination of said processes. In some embodiments, the present invention may include one or more environments. In certain embodiments, the present invention may include two or more environments. Some embodiments of the present invention may have one or more dedicated, or "fixed," environment that are limited to a particular type of environment, such as one or more of anaerobic, fermentation, anoxic, and/or aerobic. For example, a fixed anaerobic environment may be equipped with mixing equipment but no aeration equipment, an anoxic environment may be equipped with mixing equipment but no aeration equipment, and a fixed aeration environment may be equipped with aeration equipment but no mixing equipment.

In addition to one or more fixed environment, embodiments of the present invention may include one or more flexible environments configured to provide and dynamically transition between two or more of anaerobic, fermentation, anoxic, aerobic environments, and combinations thereof. In addition, in some embodiments the volume of a particular environment within such flexible environments may be varied. Examples of such embodiments are described in more detail below with reference to the figures.

Figure 1B:
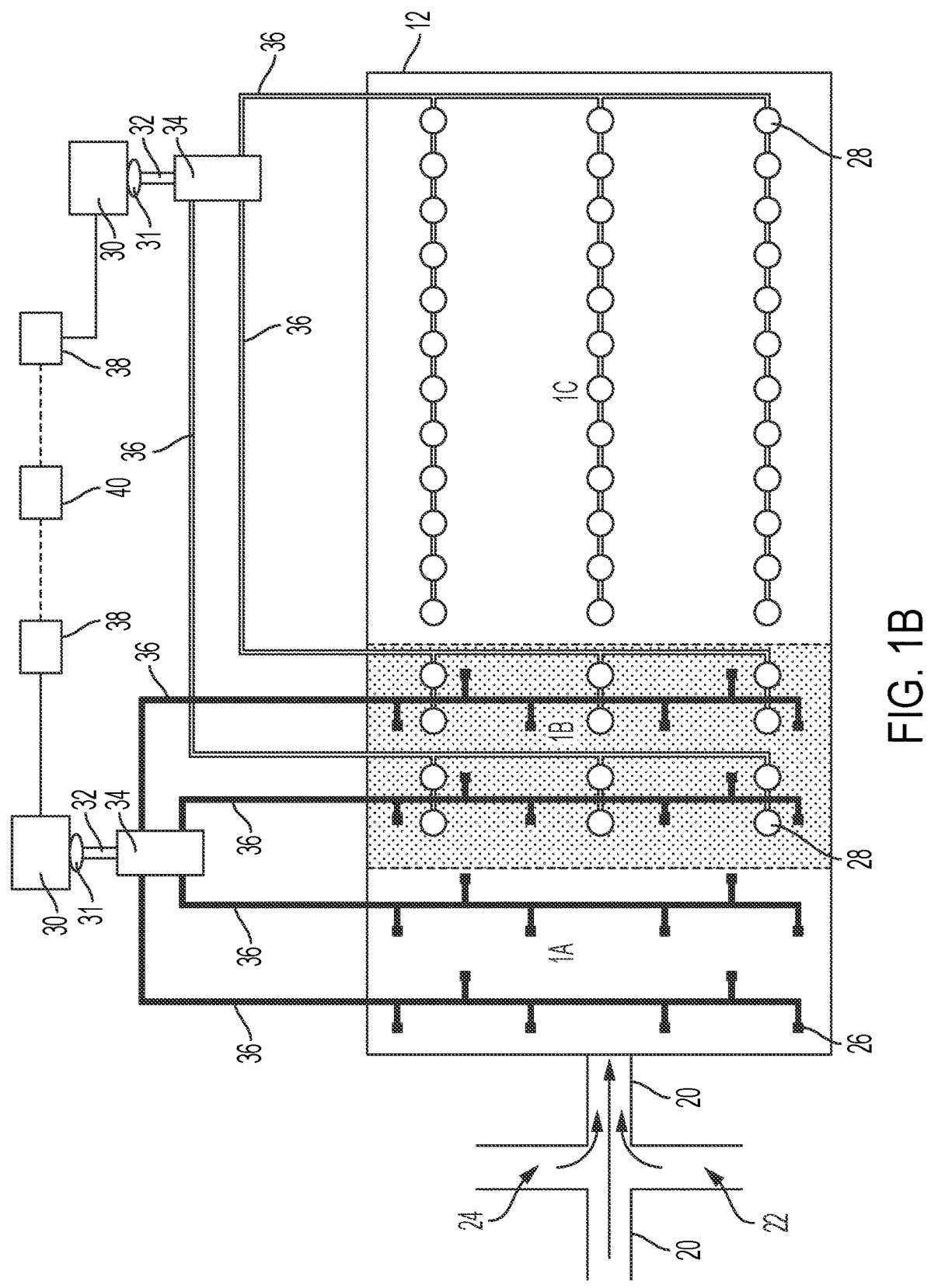
FIG. 1B is a schematic diagram of the reactor of FIG. 1A.
Figure 1C:
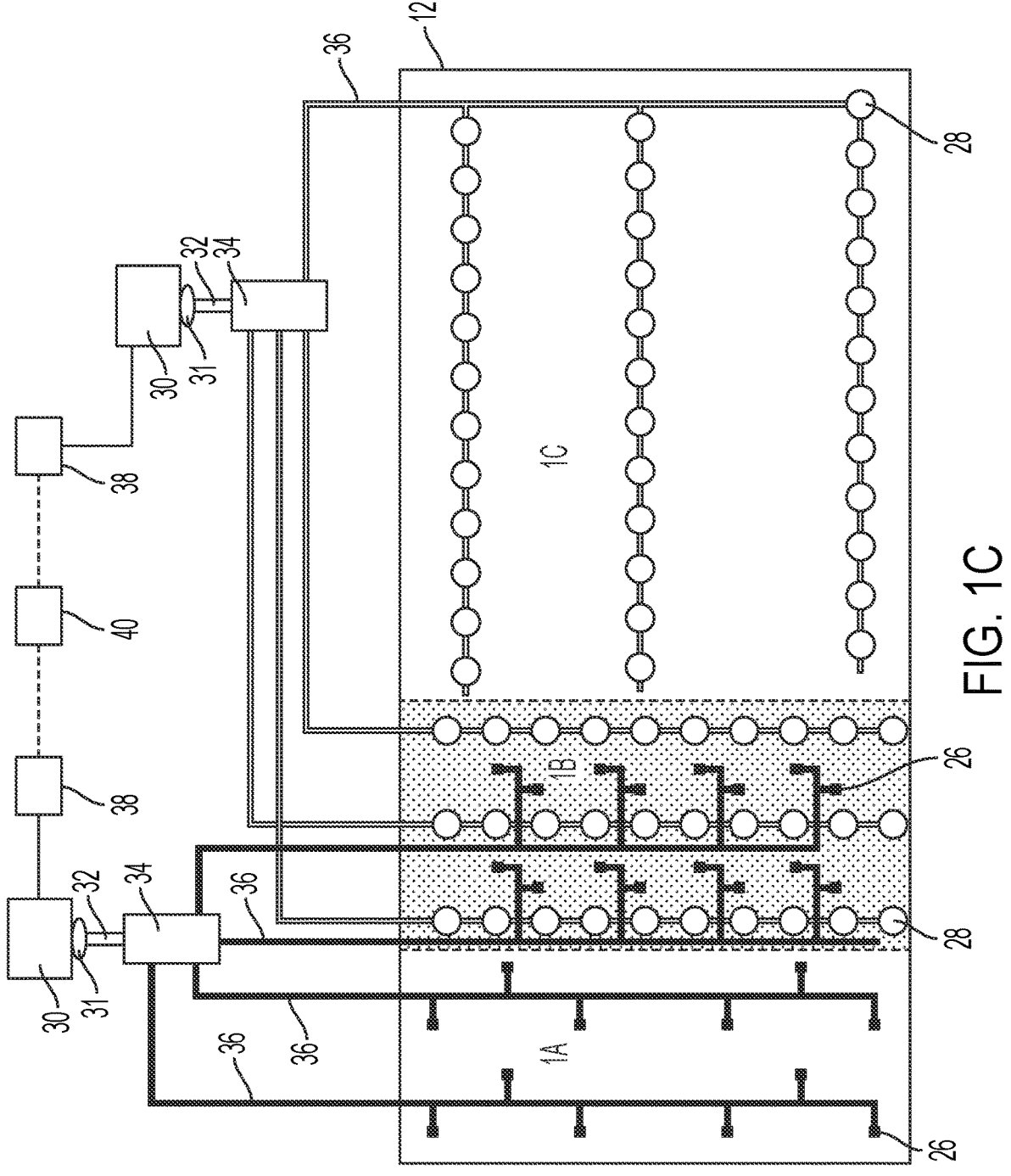
FIG. 1C is a schematic diagram of an alternative embodiment of the present invention.
Figure 1D:
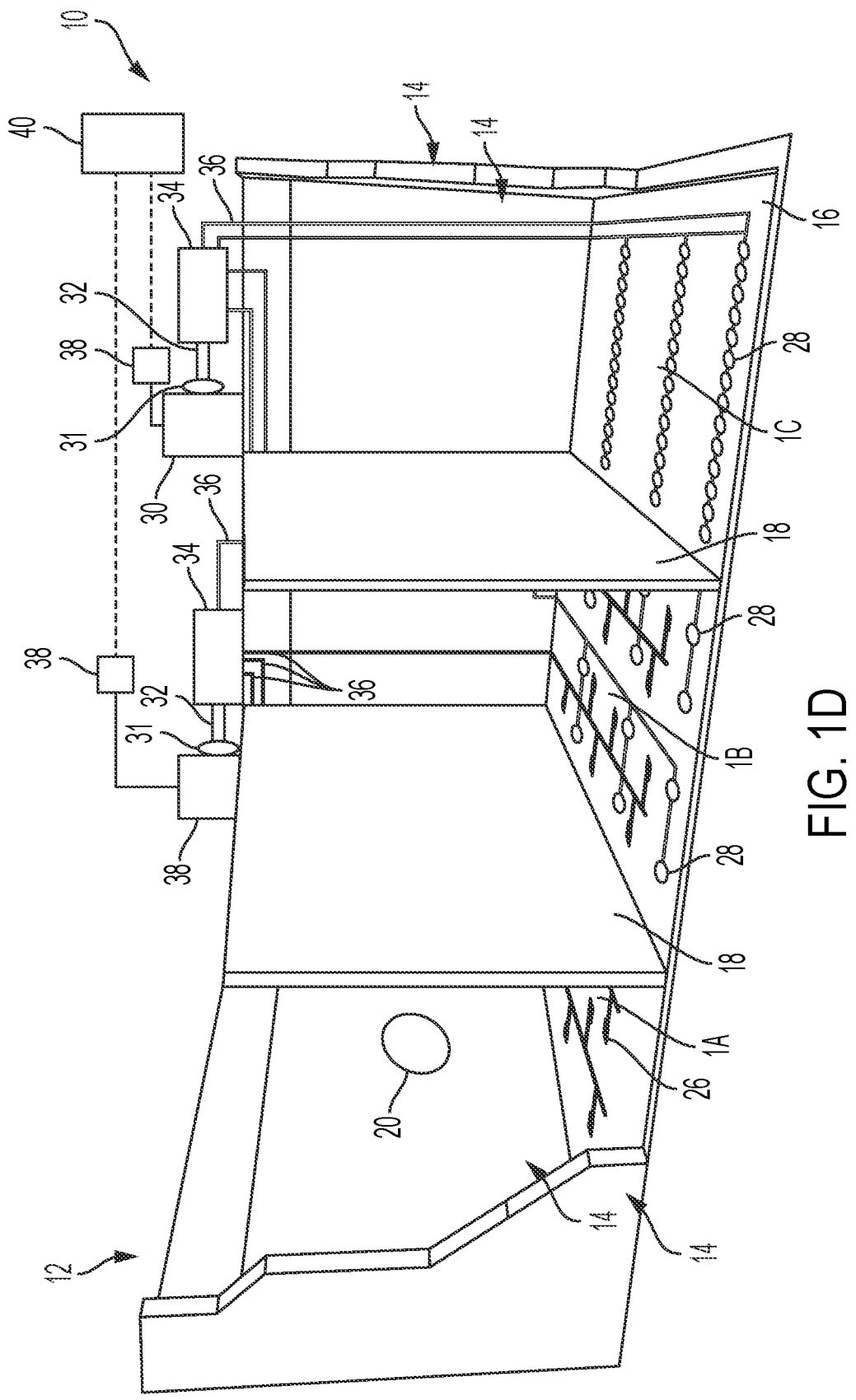

Referring to FIG. 1A, an exemplary wastewater treatment system 10 for an activated sludge process is depicted. As shown, the system 10 includes a reactor 12 for wastewater, which is shown in FIG. 1A as having four sidewalls 14, and a bottom 16. Bottom 16 may have any suitable shape, such as flat or sloped. In an alternative embodiment, such as shown in FIG. 1D, internal barriers 18 may be present. Barriers 18 may include any suitable type fixed, temporary, or permanent physical barrier, such as a wall, baffle, or curtain. In some embodiments, such as shown in FIG. 1A, some or all barriers 18 may be omitted from a reactor. Reactor 12 includes channel 20 through which wastewater may enter reactor 12. The inlet channel 20 may consist of raw wastewater, screened wastewater, screened and degritted wastewater, primary effluent, or any combination thereof. Reactor 12 also includes channel 22 through which return activated sludge (RAS) may be combined with wastewater entering reactor 12 through channel 20, as shown in FIG. 1B. The RAS may originate from a downstream clarifier or other solids separation devices, such as membrane separators or dissolved air floatation devices. In addition, reactor 12 includes channel 24 through which internal recycle (IR) may be transported to a portion of the reactor 12 as described below (and, as shown in FIG. 1), combines the IR with wastewater entering reactor 12 through channel 20. The internal recycle may originate from a downstream anaerobic, anoxic and/or aerobic environment. In some alternative embodiments, such as shown in additional examples below, the internal recycle channel 24 may be located in a distinct position from the inlet channel 20 and return activated sludge inlet 22. In still other embodiments, as also shown in additional examples below, an internal recycle channel 24 may be omitted.

Although shown with a rectangular geometry in the accompanying figures, reactors of the present invention may have any suitable geometry. By way of example, a reactor may be rectangular, oval, circular, concentric rings, or any other suitable shape. In some embodiments, multiple containment units, of the same type or of differing types, may be present and connected such that the wastewater passes through them sequentially or not connected such that wastewater passes thru them in parallel.

As shown in FIGS. 1A and 1B, mixing devices 26 and aerators 28 are positioned within reactor 12. In some embodiments, mixing devices 26 and aerators 28 may be positioned on or near bottom 16 of reactor 12. Any suitable mixing devices and aerators may be used in some embodiments of the invention. By way of example, FIG. 1C shows an alternative arrangement of mixing devices 26 and aerators 28 within reactor 12.

With further reference to FIGS. 1A and 1B, reactor 12 is shown as having environments 1A, 1B, and 1C. In all figures, dashed lines and shading are used to indicate and demarcate the distinct illustrated environments within the figure, wherein shading is simply alternated to show such separate environments. With respect to FIGS. 1A and 1B, to the shading is simply to represent the distinct zone areas), wherein such a configuration may optionally be used for providing a Modified Ludzack-Ettinger (MLE) activated sludge treatment process. As shown, these environments may have mixing devices 26 and/or aerators 28 positioned therein. In some embodiments, mixing devices 26 and aerators 28 may be positioned on or near bottom 16 of reactor 12. In all embodiments described herein, the quantity and arrangement of mixing devices and aerators within a particular environment are illustrative only and may be varied in quantity and arrangement in alternative embodiments.

As shown in FIG. 1A, environment 1A is a fixed anoxic environment that includes mixing devices 26, environment 1B is a flexible environment that is shown as equipped with mixing devices 26 and aerators 28, and 1C is a fixed aerobic environment that contains aerators 28. Mixing devices 26 and aerators 28 may be independently controlled in general. In some embodiments, mixing devices 26 and aerators 28 may be independently controlled by each environment or volume. In still other embodiments, mixing devices 26 and aerators 28 may be independently controlled at a sub-environment level as described in more detail below. As used herein, such independent control may include activation and deactivation of mixing devices or aerators and may also include the intensity of mixing or aeration. In all embodiments herein, the quantity and arrangement of mixing devices and aerators within a particular environment are illustrative only and may be varied in quantity and arraignment in alternative embodiments.

With continued reference to FIGS. 1A and 1B, environment 1B is a flexible environment. In this regard, environment 1B is configured to dynamically transition between an aerobic environment, anoxic environment, and combinations thereof by the independent control of mixing devices 26 and aerators 28 within 1B. In this regard, due to the positioning of the flexible environment 1B, the treatment environment of environment 1A and/or environment 1C may be extended to include an additional volume within the flexible environment 1B. For example, environment 1B may be operated in its entirety as an anoxic environment by activating mixing devices 26 and deactivating aerators 28. Alternatively, environment 1B may be utilized in its entirety as an aerobic environment by activating aerators 28 and deactivating mixing devices 26. In still further embodiments, mixing devices 26 may be activated and aerators 28 activated in a portion or all of environment 1B as an aerobic environment, with aerators 28 operating at a lower capacity, requiring mixing devices 26 to keep the solids in suspension. In some embodiments, not shown, a single header may connect all mixing devices in environment 1B to valve 34 and a single header may connect all aerators in environment 1B to valve 34.

In still further embodiments, mixing devices 26 may be activated and aerators 28 deactivated in a portion of environment 1B to provide an anoxic sub-environment, and mixing devices 26 may be deactivated and aerators 28 activated in another portion of environment 1B to provide an aeration sub-environment. In particular, as shown in FIGS. 1A-1D, mixing devices 26 and aerators 28 within environment 1B may be connected to valve 34 by distinct headers 36, thereby allowing mixing devices 26 on each header 36 and aerators 28 on each header 36 to be independently controlled, such as selectively activated, deactivated, and/or controlled for intensity by valves 34 as explained herein. In this regard, some embodiments of the present invention allow for multiple environments, or sub-environments, at a particular time within a flexible environment, thereby allowing for changes in the volume undergoing each treatment, such as such as anaerobic, anoxic or aerobic, within such a particular flexible environment.

Aerators of the present invention may include any suitable aeration device or combination of aeration devices, such as course bubble diffusers, fine bubble diffusers, or other types of aeration devices may be utilized, such as jet aeration systems in which pumped fluid is expelled through openings along a header or manifold and can also introduce gas into the fluid stream. Aerators may be in connection with a source of gas, such as blower 30, via a supply line 32 and header 36 wherein a valve 34 may regulate the flow of gas to an aerator or group of aerators. By permitting the control of gas to particular aerators, such as shown in FIGS. 1A-1D, the dynamic transitioning of a flexible environment described herein is realized with respect to aeration.

In addition, any suitable mixing devices may be used in connection with the present invention. By way of example, in some embodiments, propeller mixing devices, jet and pump mixing devices, any other suitable mixing device, or a combination of different mixing devices may be utilized. In some embodiments, mixing devices 26 may provide top down vertical or hyperbolic mixing, while in other embodiments, mixing devices 26 may stir the tank to provide horizontal mixing. In some embodiments, mixing devices 26 float on the surface of the tank, while in other embodiments, mixing devices are mounted between the bottom of the tank 16 and the top of the tank. In some embodiments, mixing devices 26 may provide vertical mixing within reactor 12, such as when mixing device 26 disperses a gas or liquid in a vertical manner from or near bottom 16 in an upward direction to mix the substance in the reactor. In some embodiments, mixing devices may be configured to release periodic bursts of gas into the reactor such as described in U.S. Pat. Nos. 8,505,881, 8,323,498, and U.S. Published Patent Application No. 2019/0100449, each of which is incorporated herein in its entirety by reference.

Gas may be selectively provided to such gas mixing devices and/or aerators in some embodiments of the present invention. By way of example, with continued reference to FIG. 1A, a source of gas, namely blower 30, is shown. Although illustrated outside of reactor 12, the placement of blower 30 can be in any suitable location for a particular application, including indoor and outdoor locations or within the reactor. In other embodiments, any suitable source of gas may be utilized, such as a compressor. The source of gas may supply any suitable fluid or gas, such as atmospheric air, oxygen, and/or other gases. In some embodiments, multiple sources of gas may be present, such as a separate gas source for mixing devices and aerators or, alternatively, some or all mixing devices and aerators may share a common gas source. A source of gas may be utilized to provide gas to a single containment unit or to multiple containment units, including containment units that may be related and/or unrelated in a system. In some embodiments, multiple sources of gas may be utilized. In addition, a source of gas may supply only the containment unit(s) that form part of the system or, in other embodiments, a shared gas source may supply gas to other systems as well.

In the depicted embodiment, blowers 30 are connected to supply lines 32 and to headers 36 to provide gas to the mixing devices 26 and/or aerators 28 in reactor 12. A conventional regulator 31 or a throttling valve (not shown) may be positioned to regulate the flow of gas from the blower 30 or centralized blower air supply. In addition, a flow regulation device, such as valves 34 (which may also be referenced as a valve manifold), may be placed along the supply line to regulate the flow of gas from the blower 30 to the content of reactor 12 and to selectively permit gas flow to some or all of mixing devices 26 and/or aerators 28 within reactor 12. Any suitable valve may be utilized, such as a throttling or actuating valve. In other embodiments of the invention, valves 34 may be placed in alternative positions, such as within reactor 12. In addition, other types of valves or structures to control or direct the flow of gas may be utilized within alternative embodiments of the present invention. For example, individual butterfly or other types of open/close or modulating valves with an actuator, either electro-mechanical or pneumatic, could be employed in some embodiments of the present invention. In still other embodiments, instead of multiple valves, a system may utilize one or more multi-channel valves that are capable of selectively directing gas to one or more particular headers 36. By way of further example, a single multi-port rotating valve may be utilized in some embodiments of the present invention.

With respect to mixing devices, gas may be delivered to one or more mixing devices 26 and the gas may be released from the mixing device into the substance in reactor 12 as a burst, thereby creating a mixing effect from the burst. As the gas travels upward in reactor 12 after being realized from mixing devices 26, the gas and its effect may provide a vertical mixing effect. In some embodiments, periodic or intermittent bursts may be provided from mixing devices 26. By controlling valves 34, as explained below, mixing devices may be selectively activated and deactivated and, in some embodiments, the gas volume provided to mixing devices may be regulated and modified so as to control the mixing intensity. In similar fashion, the flow of gas to aerators 28 may be selectively activated and deactivated and, in some embodiments, the gas volume provided to certain or all aerators 28 may be regulated and modified so as to control the flow rate. As noted above, other types of mixing devices, such as mechanical mixing devices, may be utilized in other embodiments of the present invention. Such other mixing devices likewise may be activated and deactivated, such as by toggling power transmission, and the intensity of mixing may be modified through devices such as variable speed drives.

By permitting the control of gas to particular mixing devices and to particular aerators as described above, the dynamic transitioning of a flexible environment described herein is realized with respect to mixing and aerating and dynamic expansion and contraction of anaerobic, anoxic and aerobic volumes in an environment. In particular, as explained above, a single flexible environment may be operated to provide multiple distinct sub-environments within that flexible environment by independently controlling each mixing device, or sets of mixing devices, and each aerator, or sets of aerators. In addition, as also described above, a flexible environment may provide multiple sub-environments within the flexible environment by selectively activating and deactivating certain mixing devices and certain aerators within the flexible environment.

In the depicted embodiment as shown in FIG. 1A, valves 34 controlling aeration and mixing are in communication with controller 38. Although illustrated as located outside of reactor 12, controllers of the present invention may be located in any suitable placement. Controller 38 may be any suitable device for controlling the gas flow, such as opening valves, closing valves, and adjusting the degree that a valve is opened. In some embodiments, controller 38 may be a programmable logic controller. As shown in FIGS. 1A and 1B, controller 38 is in communication with valves 34.

In some embodiments, controller 38 may be in communication with a control device 40, such as shown in FIG. 1A. Control device 40 include any machine having processing capacity, such as, by example, a machine having a processor, a memory, and an operating system. In some embodiments, control device 40 may include an interface for inputting such manual instruction. By way of example, and without limitation, control devices may include one or more of a personal computer, handheld computer, microcontroller, PLC, smartphone, and/or tablet. In still other embodiments, controller 38 and/or control device 40 may be any device capable of controlling the operation of a wastewater control system, such as a timer. In such embodiments, a timer or other control device or controller may be adjusted using any suitable means, such as a knob or a dial.

In some embodiments, controller 38 and/or control device 40 may be connected to a wireless and/or wired network. In addition, controller 38 and/or control device 40 may be located within controller box, in proximity to reactor 12, or at a remote location, such as within a treatment facility or at another site. In still other embodiments, a controller and a control device may be a single device. In addition, an existing facility may have existing controllers or control panels or hardware and the present invention could be interfaced with those existing systems, such as by loading software to perform the processes described herein and communicate with the previously-existing structures. Furthermore, as noted, controller 38 and/or control device 40 may be remotely accessible, and it may be configured to a network or internet connection. In addition, controller 38 and/or control panel 40 may permit an operator to manually control the processes and system components, such as manually overriding the automatic control and activating or deactivating aeration to the wastewater. Controller 38 and/or control device 40 may also be configured with a storage medium to record and archive system parameters and operating conditions, wherein such historical information may be an optional factor utilized in controlling the mixing and/or aeration in flexible environments.

As used herein, reference to "in communication with" indicates that data and/or signals are transferrable between the referenced components, and such reference includes both physical connections and wireless connections. In addition, "in communication with," whether used in connection with data or otherwise, also includes embodiments in which the referenced components are in direct connection (i.e., directly connected to each other) as well as indirect connections, such as when data is transmitted through an intermediate component and either relayed in the same format or converted and then relayed to the referenced component. Furthermore, as used herein, the terms "connected" and "attached," and variations of those terms, includes, unless indicated otherwise by the context, components that are in direct connection and components that are indirectly connected by way of other components.

As explained above, the environment within a flexible environment of the present invention may be dynamically adjusted. For example, as explained above with respect to FIG. 1A, environment B1 may provide an anoxic environment, an aerobic environment, or combinations thereof. In some embodiments, the determination of the environment or environments provided by a flexible environment of the present invention may be based, in whole or in part, on the parameters of the influent substance to be treated, the parameters of the substance within the reactor undergoing treatment, historical parameters, environmental conditions, other factors, or combinations of any such factors.

Because wastewater is subject to dynamic changes in properties, a particular system and its substance may require dynamic changes to the treatment environment being provided. Flexible environments of the present invention allow for such dynamic modifications. With reference to FIG. 1A, if the wastewater in reactor 12, whether due to its volume, content, or other factors, requires an additional volume of wastewater to be subjected to an aerobic environment, some or all of flexible environment 1B may be utilized to provide such aeration by activating some or all aerators 28 in environment 1B. Similarly, flexible environments in other embodiments may dynamically transition based on the particular wastewater treatment needs within a particular system.

By way of example, the operation of flexible environments and the environment they provide at a particular point in time may be determined manually or by controller 38 and/or control device 40. In some embodiments, the aerobic volume required within a reactor to maintain nitrification may be determined based on the aerobic solids retention time (SRT) necessary for the water temperature to maintain complete nitrification. Other similar parameters to SRT, such as mean cell residence time (MCRT) or other parameters, may also be utilized in some embodiments. At a lower water temperature, a longer aerobic SRT may be required and may require more aerobic volume in the reactor 12. At a higher water temperature, a shorter aerobic SRT may be required and may not need as much aerobic volume in the reactor 12. In such embodiments, the remainder of the reactor may be utilized to provide anaerobic and anoxic environments for biological phosphorous removal and denitrification. The SRT, aerobic SRT, mean cell residence time (MCRT) or other parameter used to determine the aeration volume required within a reactor may be based upon influent COD or BOD, influent COD/N or BOD/N ratio, dissolved oxygen levels, temperature, mixed liquor suspended solids (MLSS), nitrate values (such as the nitrate knee in alternating aerobic/anoxic environments), effluent ammonium, sludge yield, and combinations thereof. Such parameters may also include a safety factor determined for a particular treatment reactor or treatment facility, which may be based on average loads, maximum loads, aeration supply integrity, dissolved oxygen control, industry loads, operator confidence, and combinations thereof.

In addition, the effluent total nitrogen (TN) requirement may be utilized in some embodiments to determine the required anoxic volume and the internal recycle rate (IR). The anoxic volume required may be based upon the temperature (which impacts denitrification rate) and both influent characterization and target effluent ammonium and TN (which define the nitrogen balance and denitrification requirement). A lower TN requirement may require more anoxic volume and higher IR rate. A higher TN target may require less anoxic volume and reduced IR rate, therefore allowing for adjustment of volume to include more anaerobic volume, as needed for biological phosphorus removal. Flexible environments of the present invention allow for such transitions of environments and volumes within such environments. In other embodiments, the IR flow rate may be adjusted up or down based on the effluent TN requirement, while in even other embodiments, the IR flow may be suspended or relocated to another environment or portion of a flexible environment.

In other embodiments, the environment of a flexible environment at a particular time may be determined based on influent flow rate, influent content, or time of day or time of year. For example, such factors may include diurnal flow fluctuations, daily diurnal flow fluctuations, weekly diurnal flow fluctuations, monthly diurnal flow fluctuations, annual diurnal flow fluctuations, initial start-up versus design flow conditions, seasonal fluctuations in flow conditions, or combinations of any such factors. In these embodiments, the flexible environment may use more aerobic volume during high flow events and conversely, the flexible environment may use less aerobic volume during low flow events. In some embodiments, during low flow events, the entire flexible volume may only use mixing to reduce energy usage. In other examples the flexible environment may transition between different environments such as anaerobic, anoxic or aerobic to meet different water quality adjustments that are seasonally defined, such as summer and winter permit requirements.

In yet other embodiments, the environment of a flexible environment at a particular time may be selected manually using an operator interface terminal (OIT). In some embodiments, the user may manually select to change a flexible environment to mixing only, aeration only, or a combination thereof, regardless of the environment desired and solely related to energy consumption, equipment maintenance, or another similarly related parameter.

Other factors may also be utilized in determining the environment(s) provided by a particular flexible environment. For example, such factors may include diurnal loading fluctuations, daily diurnal loading fluctuations, weekly diurnal loading fluctuations, monthly diurnal loading fluctuations, annual diurnal loading fluctuations, temperature changes of wastewater, seasonal effluent water quality requirements, seasonal fluctuations in loading conditions, or combinations of any such factors. In these embodiments, the flexible environment may use more aerobic volume during high loading events and conversely, the flexible environment may use less aerobic volume during low loading events. In some embodiments, during low loading events, the entire flexible volume may only use mixing to reduce energy usage. The influent loading at any given time for a wastewater treatment facility may be determined based on influent flow and corresponding chemical oxygen demand (COD), biochemical oxygen demand (BOD), total suspended solids (TSS), ammonia (NH4), nitrate (NO3), total nitrogen (N) and/or phosphorus (P) concentrations, among other similar items. In some embodiments, the initial start-up versus design load conditions may also be utilized in determining an environment provided within a particular flexible environment. In particular, the loading of a typical wastewater treatment plant is generally lower during startup conditions, compared to design conditions for the plant. A typical wastewater treatment plant may never reach the design conditions for the plant and may consistently operate in an underloaded condition. The use and operation of flexible environments of the present invention permit dynamic adjustments for such underloaded conditions in real time.

Other factors may also be utilized in determining the environment(s) provided by a particular flexible environment. For example, such factors may include temperature changes of wastewater, seasonal effluent water quality requirements, seasonal fluctuations in loading conditions, or combinations of any such factors. In some embodiments, the flexible volume may include more aerobic volume if the temperature is lower or if the seasonal effluent water quality requirements are more stringent. Conversely, the flexible volume may include less aerobic volume if the temperature is higher or the seasonal effluent water quality requirement is less stringent. The seasonal effluent water quality requirements may be entered directly into the control device 40 to automatically adjust the parameters, or in other embodiments, the user may just select an operating mode such as "summer" vs. "winter". In some embodiments, the flexible environment would then automatically adapt based on pre-programmed setpoints that determine aerobic, anoxic, and/or anaerobic volumes and the configuration of said volumes and required internal recycle loops and internal recycle flow rates. In other embodiments, the flexible environment would use any of the parameters listed herein combined with the operating mode to determine aerobic, anoxic and/or anaerobic volumes. In still other embodiments, as described above, flexible environment of the present invention may dynamically operate based upon real-time wastewater flow or content or other real-time system parameters.

In addition to the flexible environment, the mixing and/or aeration within fixed environment may also be dynamically varied in some embodiments of the present invention. For example, if the load within a reactor does not require constant aeration and/or mixing, or alternatively permits a reduced aeration flow rate and/or mixing intensity, the mixing devices and/or aerators in such fixed environment may be independently and selectively controlled, either for a whole or partial environment or volume of an environment, to provide the mixing and/or aeration based upon the actual needs of the wastewater in the reactor. In this regard, the amount, duration, and frequency of gas supplied to each mixing devices and/or aerators in each environment, or to various portions of each environment or volume of an environment, may be adjusted proportionately (as dictated by the controller 38 and/or control device 40) based upon a measured or calculated volume, flowrate, process parameter (such as COD or NH4), and/or based on other measured or calculated parameters of the substance in the reactor, to account for dynamically-changing operating conditions. Thus, as the substance level and/or substance parameters increase or decrease, the system may modify the mixing and/or aeration duration, frequency, and/or intensity. Examples of methods of measuring and determining such volume or substance parameters of the treatment substance are disclosed in U.S. Pat. Nos. 8,505,881, 8,323,498, and U.S. Published Patent Application No. 2019/0100449, each of which is incorporated herein in its entirety by reference. Appropriate data for such operations can be stored in a memory in or connected to the controller and/or control panel.

Figure 2:
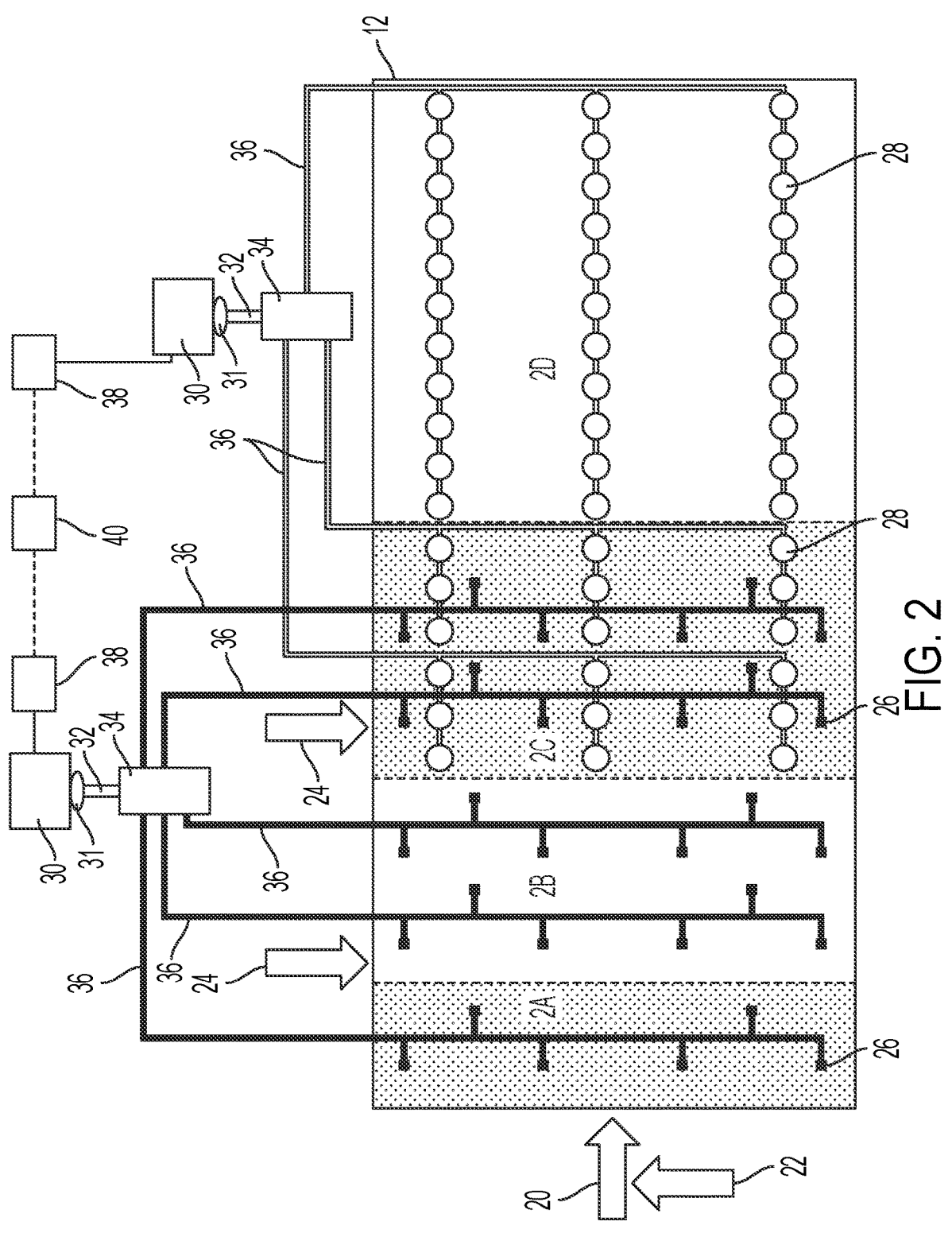
FIGS. 2-8 each illustrate a schematic diagram of an embodiment of the present invention having a reactor with one or more dynamically transitioning flexible environments.

FIGS. 2-7 provide additional exemplary embodiments of the present invention. For example, FIG. 2 shows embodiment of the invention have environments 2A, 2B, 2C, and 2D, wherein there are multiple flexible environments, namely environment 2B and environment 2C. Such an embodiment may optionally be used to provide an anaerobic/anoxic/oxic (A2O) treatment process. In this embodiment, environment 2A is a fixed environment having mixing devices 26, environment 2B is a first flexible environment having mixing devices 26 and flexibility to operate as anaerobic or anoxic depending on selection of internal recycle flow 24 location, environment 2C is a second flexible environment having mixing devices 26 and aerators 28, and environment 2D is a fixed aerobic environment having aerators 28. In some embodiments, flexible environments 2B and 2C may dynamically transition between providing an anaerobic environment and an anoxic environment, or combinations thereof. In addition, flexible environment 2C in some embodiments may dynamically transition between providing an anoxic environment and an aerobic environment, or combinations thereof. When environment 2A operates in an anaerobic environment and flexible environment 2B operates, in whole or in part, in an anaerobic environment with the selection of internal recycle flow 24 location, flexible environment 2B operates to effectively extend the environment of environment 2A. In addition, when environment 2D operates in an aerobic environment and environment 2C operates, in whole or in part, in an aerobic environment, 2C effectively extends the environment of environment 2D. Such dynamic transitioning of each flexible environments may be premised upon the system requirements as discussed above.

In addition, the embodiment shown in FIG. 2 includes multiple internal recycle channels 24. A first internal recycle channel 24 may provide internal recycle to flexible environment 2B. However, the internal recycle may contain nitrate, any internal recycle to an anaerobic environment may cause that intended anaerobic environment to become anoxic. As a result, a valve (not shown) or other flow control mechanism may be actuated, such as by a controller 38 or control device 40, to close that first internal recycle channel 24 to environment 2B when environment 2B is in an anaerobic environment. In such circumstances, such internal recycle may be routed to 2C via second internal recycle channel 24, wherein a valve a valve (not shown) or other flow control mechanism may be actuated, such as by a controller 38 or control device 40, to open second internal recycle channel 24. Internal recycle channels 24 may be independently opened and closed based upon the needs of the system at any given time. In this manner, the configuration and control of internal recycle channels permits the effective transition of a flexible environment between an anaerobic environment and an anoxic environment.

Figure 3:
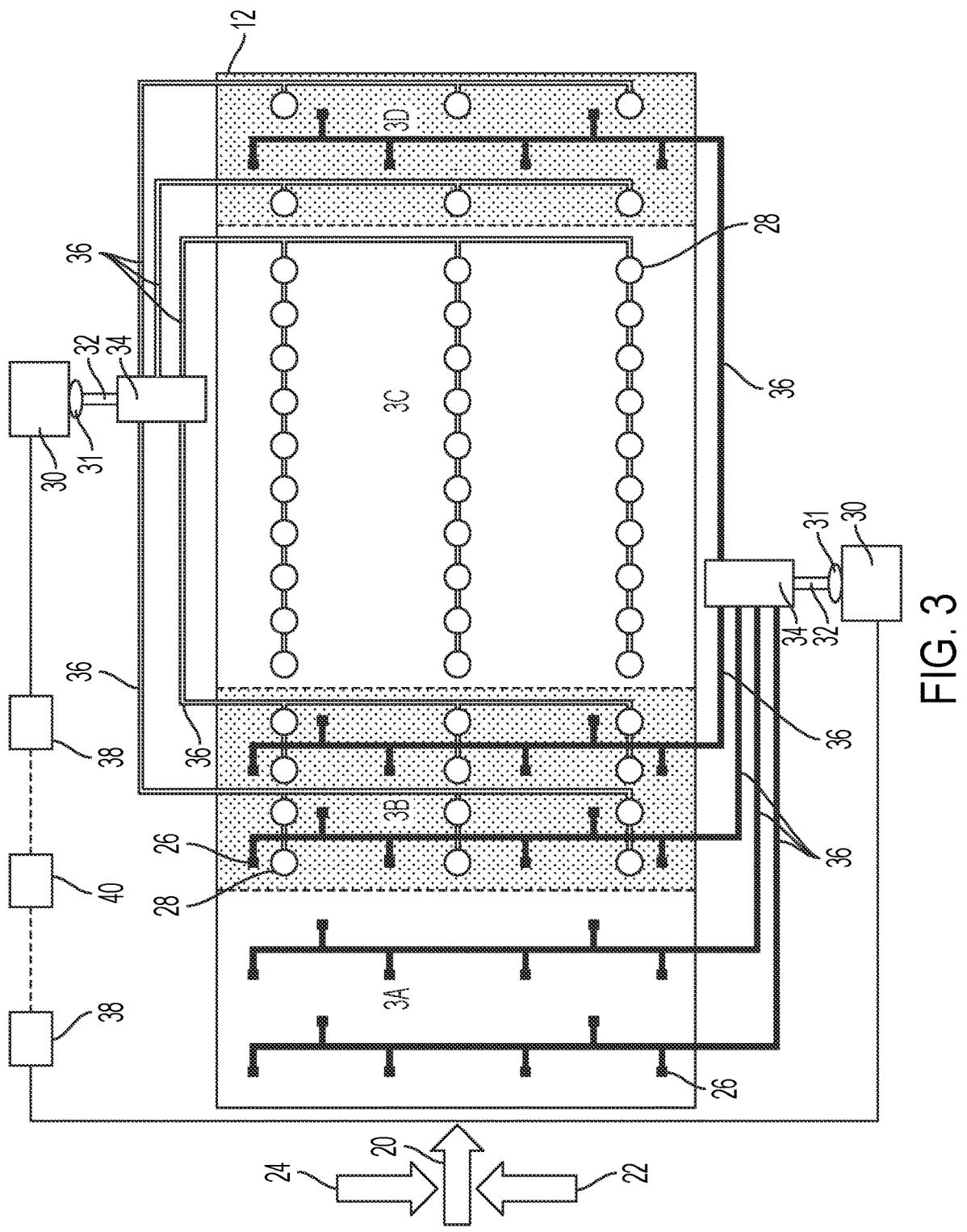

FIG. 3 provides yet another illustrative embodiment of the invention having two fixed environments and two non-adjacent flexible environments. Such an embodiment may be used in some instances for providing a Bardenpho 4-Stage treatment process. In such an embodiment, environment 3A may operate as a fixed anoxic environment having mixing devices 26, environment 3B may operate as a first flexible environment having mixing devices 26 and aerators 28, environment 3C may operate as a fixed aerobic environment equipped with aerators 28, and environment 3D may operate as a second flexible environment having mixing devices 26 and aerators 28. In this embodiment, flexible environments environment 3B and environment 3D may operate in an anoxic environment, an aerobic environment, or combinations thereof. Such a configuration may allow each flexible environment to dynamically extend the treatment environment of its adjacent fixed environments based on the needs of the system as described above.

Figure 4:
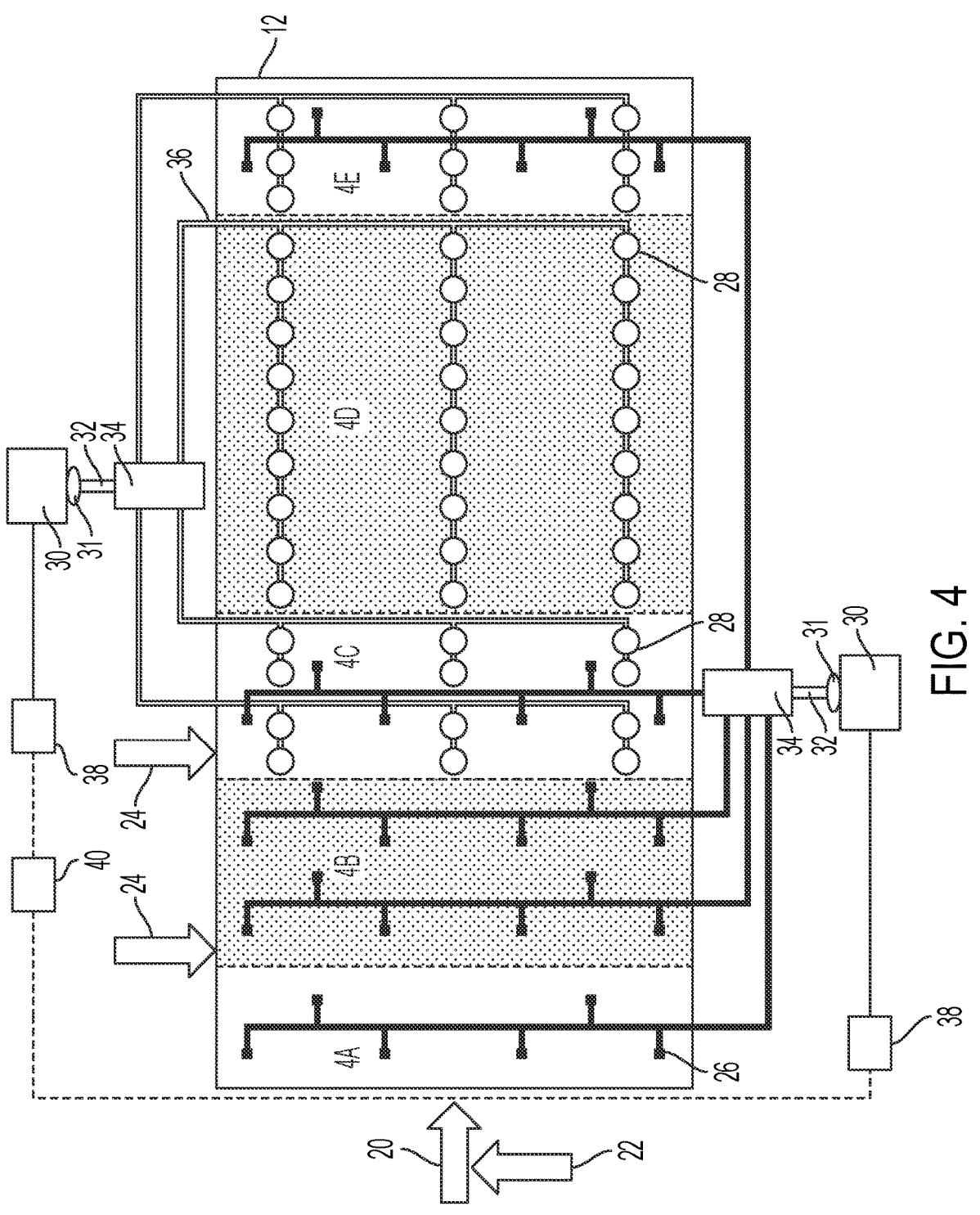

FIG. 4 provides still another illustrative embodiment of the invention. In this embodiment, which may optionally be used for providing a Bardenpho 5-Stage treatment process, there are two fixed environments and three flexible environments. As shown, environment 4A is a fixed anaerobic environment having mixing devices 26, environment 4B is a first flexible environment depending on selection of internal recycle channel 24 flow location having mixing devices 26, environment 4C is a second flexible environment having mixing devices 26 and aerators 28, environment 4D is a fixed aerobic environment equipped with aerators 28, and environment 4E is third flexible environment having mixing devices 26 and aerators 28. In some embodiments, flexible environment 4B may be capable of transitioning between providing an anaerobic environment and an anoxic environment, and combinations thereof, and flexible environment 4C and flexible environment 4E may alternate between providing an anoxic environment, an aerobic environment, and combinations thereof.

As shown in FIG. 4, multiple internal recycle channels 24 may be present. As previously explained, multiple internal recycle channels 24 permit flexible environments to receive or not receive internal recycle based on the desired flexible environment at any given time. By way of example, when a flexible environment such as environment 4B is operating in an anaerobic environment, internal recycle channel 24 to environment 4B may be closed to avoid any nitrate in the internal recycle converting the desired anaerobic environment of environment 4B to an anoxic environment. However, when environment 4B is operating in an anoxic environment, internal recycle channel 24 to environment 4B may be opened.

Figure 5:
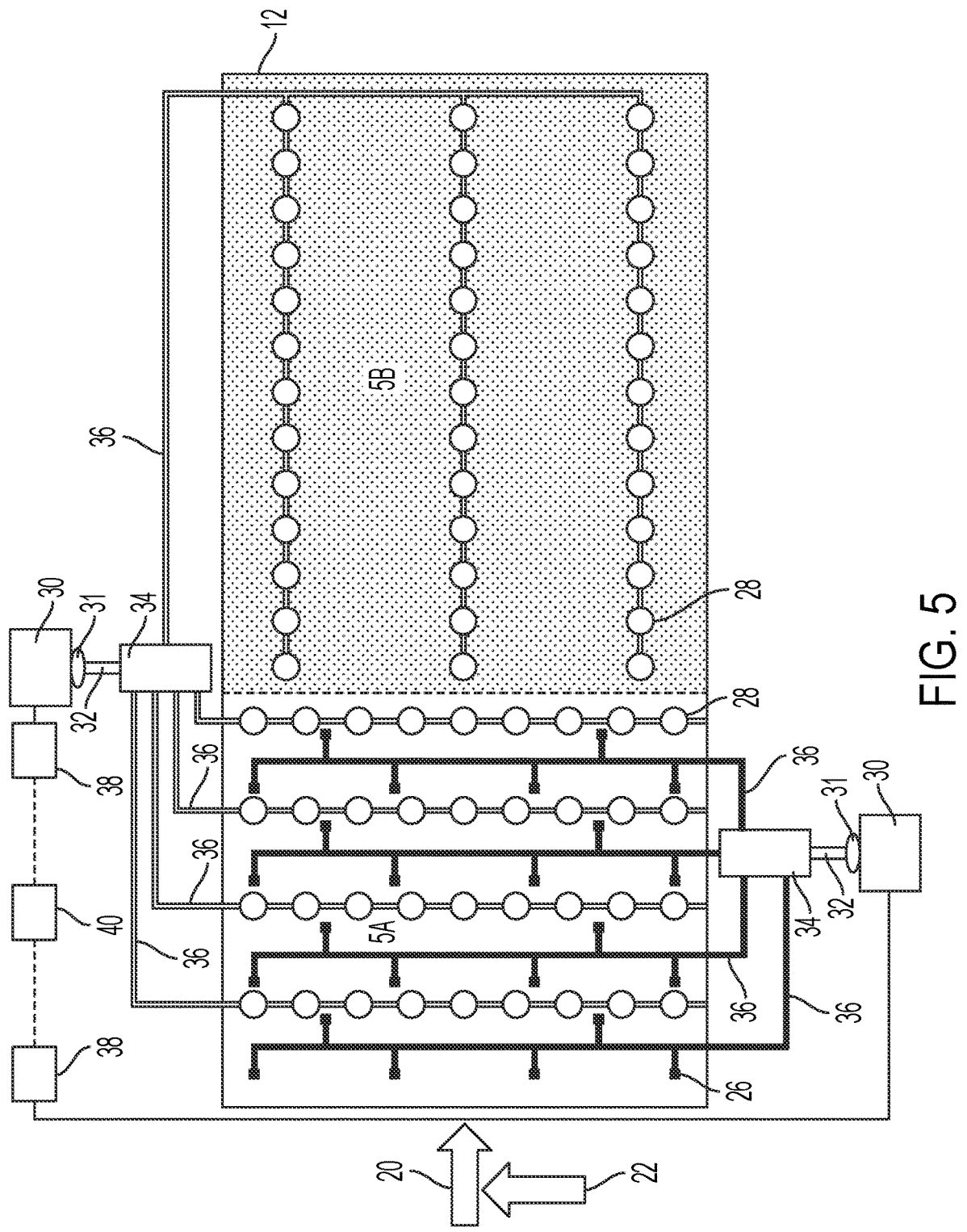

FIG. 5 provides an alternative embodiment of the present invention that may optionally be used for providing nitrification and denitrification processes. In this embodiment, environment 5A is a flexible environment having mixing devices 26 and aerators 28 and environment 5B is a fixed aerobic environment equipped with aerators 28. In a nitrification process, environment 5A may operate in an anoxic environment or an aerobic environment or a low oxic environment, and environment 5B may be fixed in an aerobic environment. In this manner, flexible environment 5A may dynamically transition, in whole or in part, between an aerobic environment that effectively extends environment 5B and an anoxic state. With respect to the embodiment shown in FIG. 5 and also the embodiments shown in FIGS. 6-8 and discussed below, the purpose of adjusting the flexible environment to include anoxic volume may be to reduce energy consumption by eliminating mixing limited aerated volumes, to facilitate carbon reduction via dentification, to facilitate denitrification or simultaneous nitrification/denitrification for total nitrogen reduction either with or without an internal recycle, to increase alkalinity recovery via denitrification, to eliminate or reduce the need for carbon addition, to improve settleability by selecting the growth of densified biological floc and discourage filamentous growth, and/or any combination of the foregoing.

Figure 6:
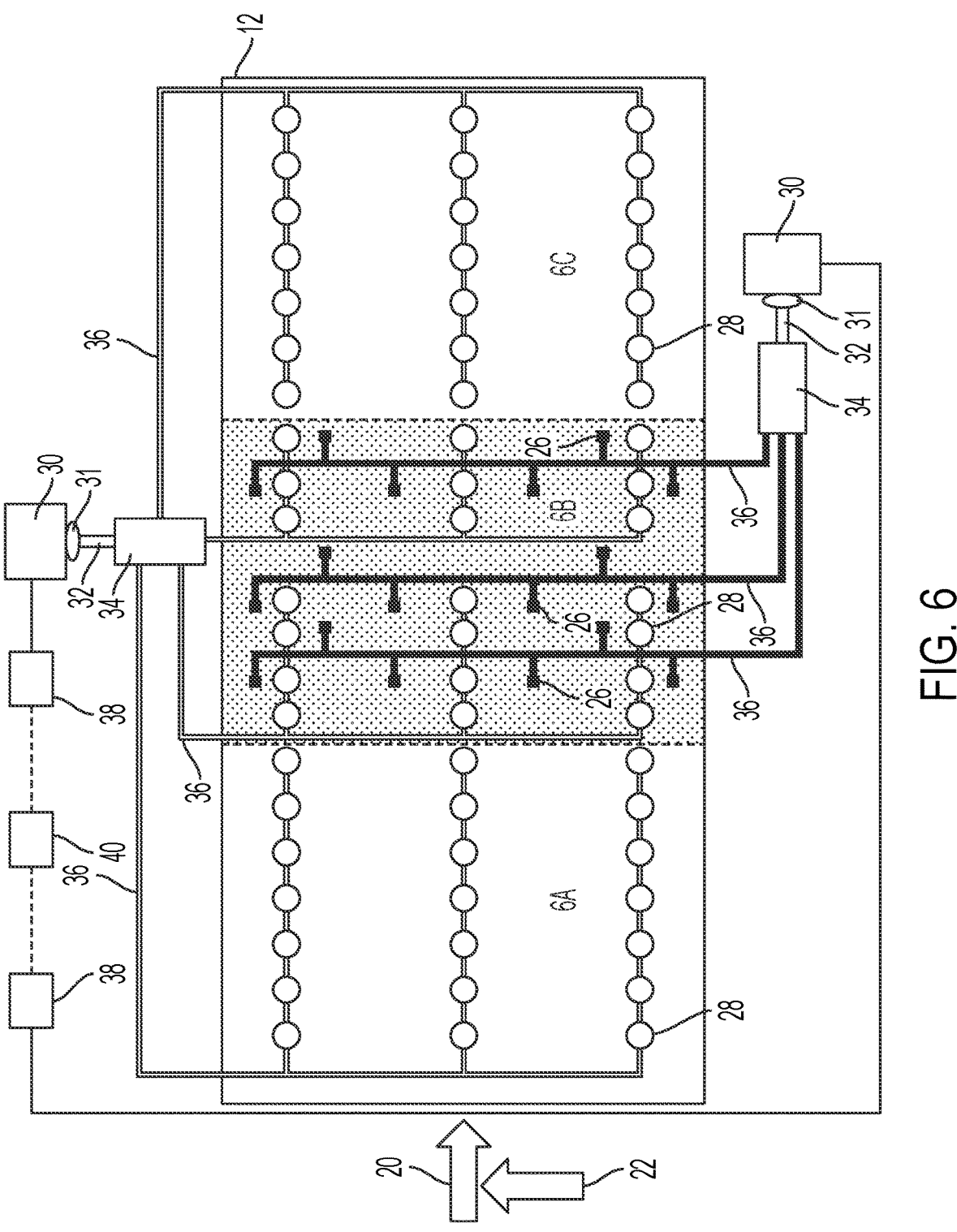

FIG. 6 provides an alternative embodiment of the present invention that may optionally be used for providing nitrification and denitrification processes. In this embodiment, environment 6A is a fixed aerobic environment equipped with aerators 28, environment 6B is a flexible environment having mixing devices 26 and aerators 28, and environment 6C is a fixed aerobic environment equipped with aerators 28. Thus, flexible environment 6B may extend the aeration environment of environment 6A and/or environment 6C when environment 6B operates, in whole or in part, in an aerobic environment or environment 6B may alternatively transition, in whole or in part, to an anoxic environment. This configuration allows for denitrification, without the need for an internal recycle.

Figure 7:
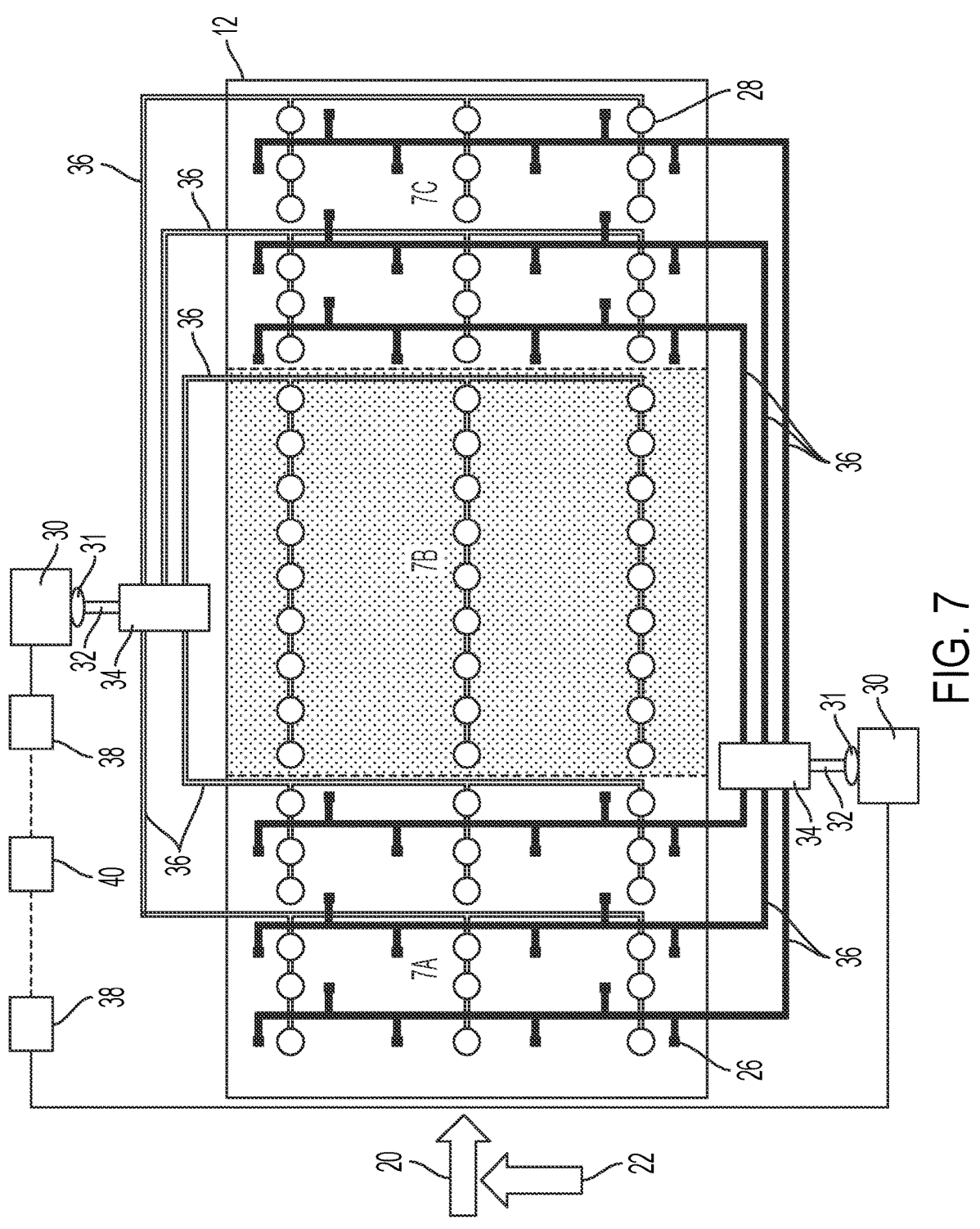

FIG. 7 illustrates yet another exemplary embodiment of the present invention. Similar to the embodiments of FIGS. 5 and 6, the embodiment of FIG. 7 may be used for nitrification and denitrification processes. In this embodiment, environment 7A is a first flexible environment having mixing devices 26 and aerators 28, environment 7B is a fixed aerobic environment equipped with aerators 28, and environment 7C is a second flexible environment having mixing devices 26 and aerators 28. In some embodiments, flexible environments 7A and 7C may be capable of dynamically transitioning between anoxic environments and aerobic environments. This configuration allows for denitrification, without the need for an internal recycle.

Figure 8:
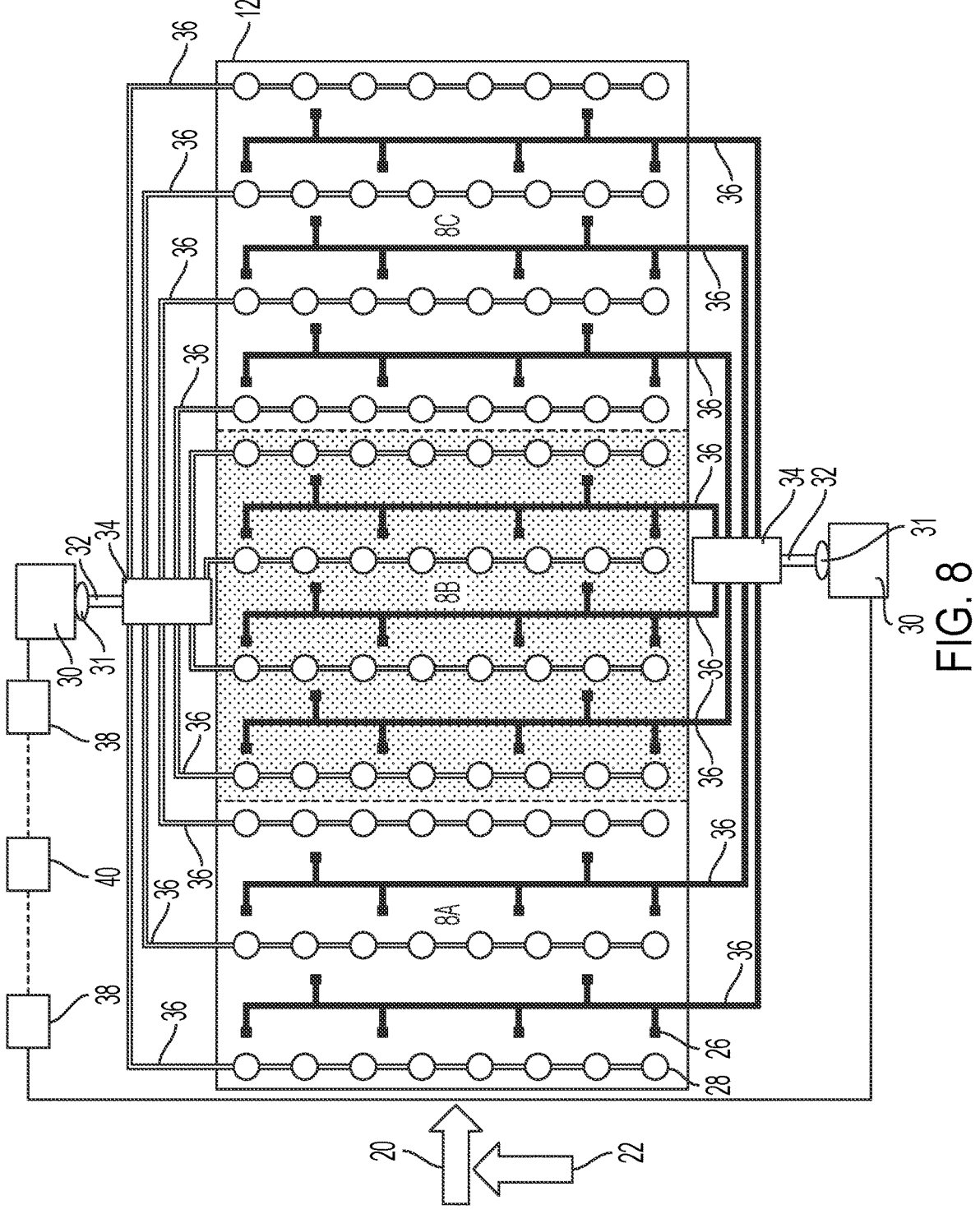

FIG. 8 illustrates yet another exemplary embodiment of the present invention. Similar to the embodiments of FIGS. 5, 6 and 7, the embodiment of FIG. 8 may be used for nitrification and denitrification processes. In this embodiment, environment 8A is a first flexible environment having mixing devices 26 and aerators 28, environment 8B is a second flexible environment equipped with mixing devices 26 and aerators 28, and environment 8C is a third flexible environment having mixing devices 26 and aerators 28. In some embodiments, flexible environments 8A, 8B, and 8C may be capable of dynamically transitioning between anoxic environments and aerobic environments. In some embodiments, the mixing equipment 26 may be operating in all flexible environments 8A, 8B, and 8C, with either no or minimal aerators 28 in operation due to mixing limited conditions. Mixing limited conditions may be defined as when the aerators 28 are not providing enough gas to complete mix the contents of the reactor 12, and as such, require mixing devices 26 to operate simultaneously. This embodiment may be selected for wastewater treatment facilities that have high infiltration and inflow which may require them to operate all reactors 12 at the plant, despite not having a need for the aerobic volume due to low influent loading, especially during diurnal troughs, for example in the middle of the night. The result of operating with flexible environments 8A, 8B, and 8C with only mixing equipment shows the greatest energy savings potential.

In some embodiments, as noted above, reactor 12 shown in any of the accompanying figures may not include barriers 18 between some or all environments. By way of example, FIG. 1C illustrates the embodiment of FIG. 1A without any barriers 18 as compared with FIG. 1D which illustrates the embodiment of FIG. 1A having barriers 18. In some particular embodiments a barrier may not be present between a flexible environment and one or more adjacent environments, such as shown in FIG. 1C and FIGS. 2-10. In such embodiments, the use of mixing devices providing vertical mixing, as explained above, may be used such that the mixing may be isolated to the intended area of the flexible environment even in the absence of physical barriers 18.

Figure 9:
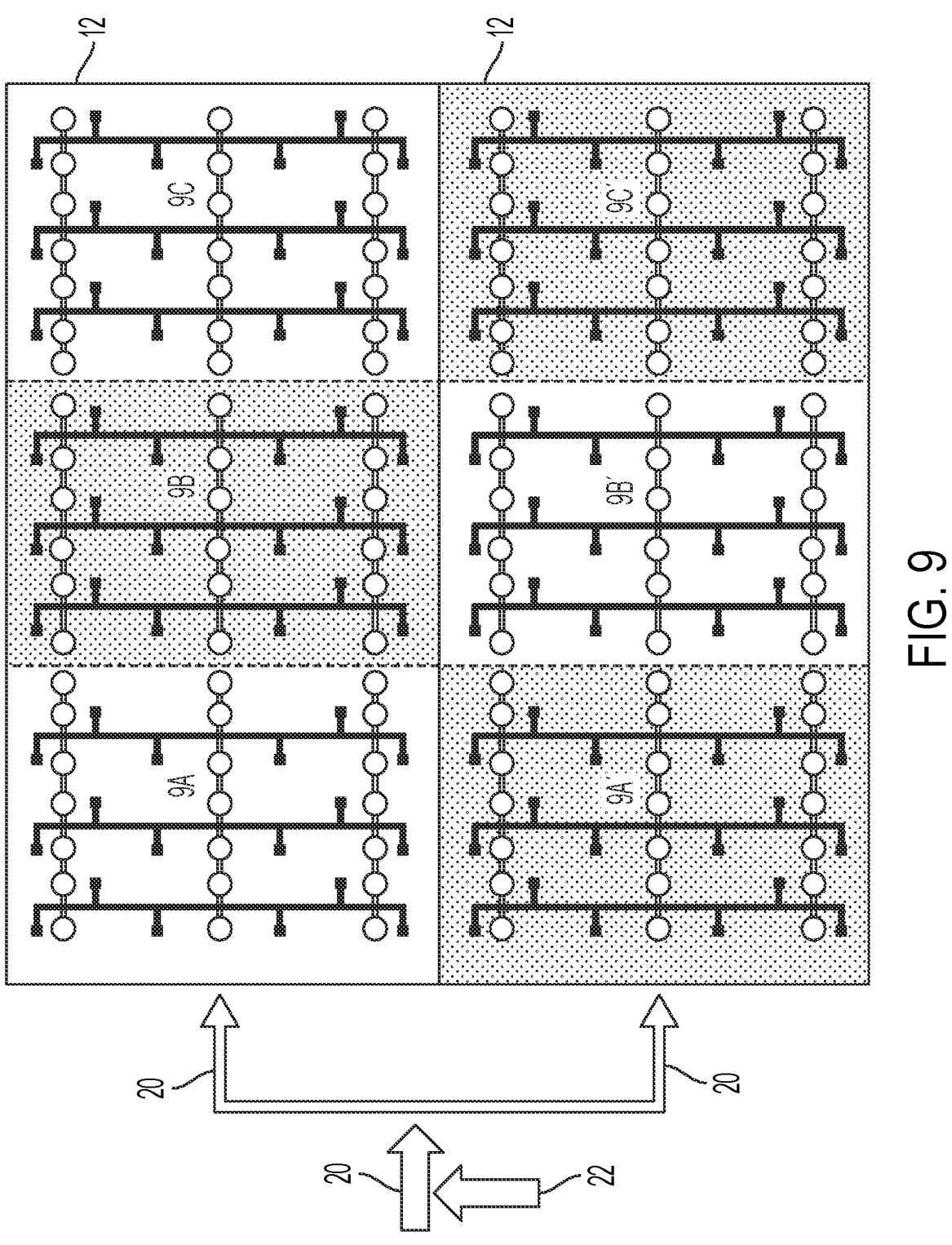
FIG. 9 is a schematic embodiment of a schematic diagram of an embodiment of the present invention having two parallel reactors with multiple dynamically transitioning flexible environments within each reactor.
Figure 10:
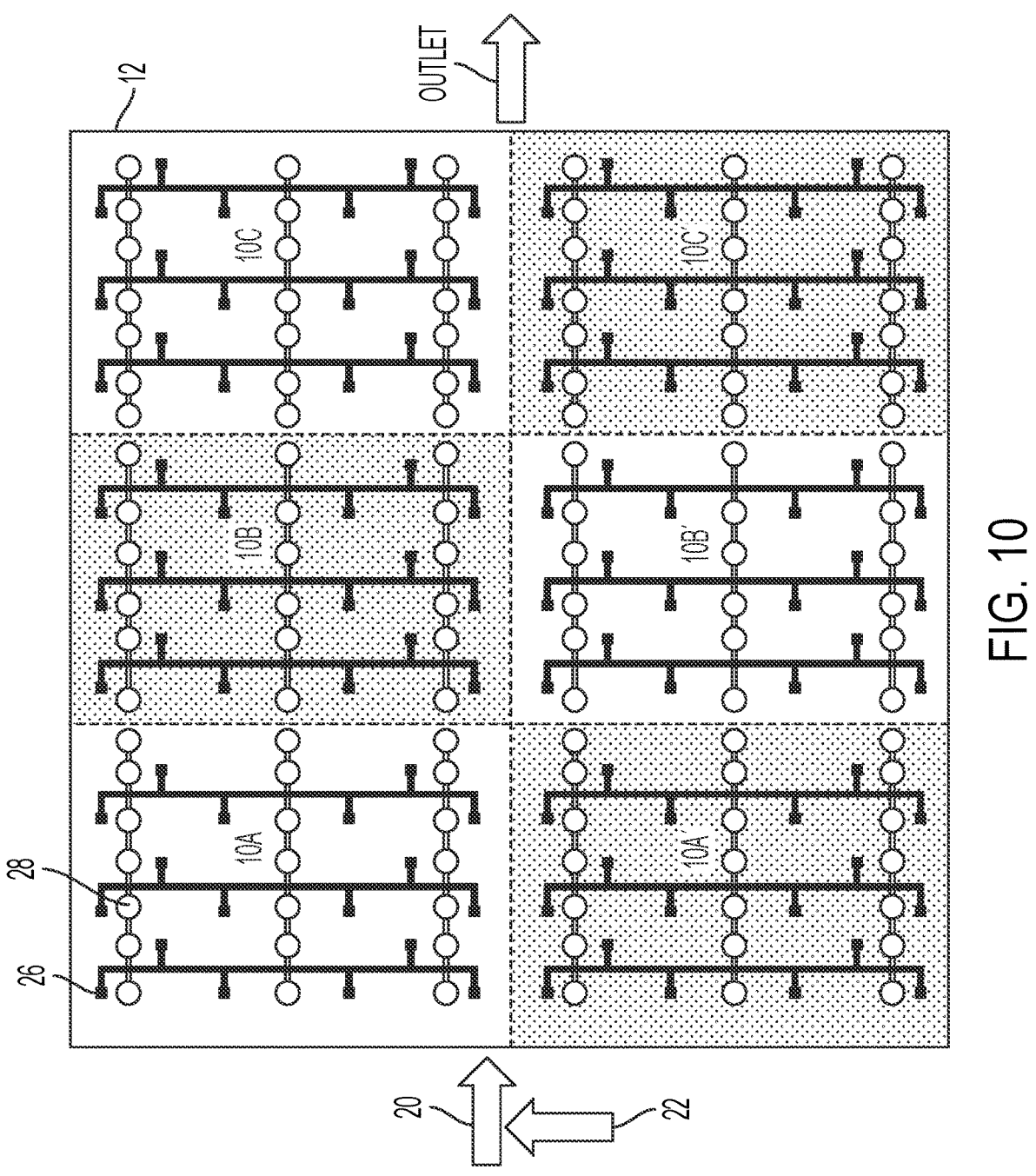
FIG. 10 is a schematic diagram of an embodiment of the present invention having a reactor with multiple dynamically transitioning flexible environments arranged in an array with the ability to alternate environments in series or in parallel within the array.

In some embodiments, flexible environments of the present invention may be applied in series through the length of a tank (such as shown in FIG. 9 discussed below), whereas in other embodiments the flexible environment may be applied with multiple environments across the width of a tank (such as shown in FIG. 10 discussed below). For applications with multiple trains or tanks in parallel, flexible environments can be operated to provide the same environment(s) or to provide distinct environments independent of each other (such as, by way of example, one train's flexible environment could be aerobic while the other train's flexible environment could be anoxic).

For example, as shown in FIG. 9, one exemplary embodiment of the present invention is shown that includes two reactors 12 with each reactor 12 having three flexible environments. Flexible environments 9A, 9B, and 9C are located in a first reactor 12 and flexible environments 9A', 9B', and 9C' are located in a second parallel reactor 12. Each of flexible environments 9A, 9B, 9C, 9A', 9B', and 9C' are shown as equipped with mixing devices 26 and aerators 28. As wastewater enters the reactor 12, the wastewater may be routed through environments 9A, 9B, and 9C or alternatively routed through environments 9A', 9B', and 9C' or, as a further alternative, to both environments 9A, 9B, and environments 9C and 9A', 9B', and 9C', equally split or disproportionally split. In some embodiments, environments 9A, 9B, 9C, 9A', 9B', and 9C' may each be capable of independently and dynamically transitioning between anoxic environments and aerobic environments.

In still another embodiment, shown in FIG. 10, a single reactor 12 includes six flexible environments 10A, 10B, 10 C, 10A', 10B' and 10C'. As shown, no physical barriers are present between any of the environments whereas such physical barriers could be present in alternative embodiments. Each of flexible environments 10A, 10B, 10C, 10A', 10B', and 10C' are shown as equipped with mixing devices 26 and aerators 28. In operation, wastewater may enter reactor 12 through inlet channel 20. In some embodiments, environments 10A, 10B, 10C, 10A', 10B', and 10C' may each be capable of independently and dynamically transitioning between anoxic environments and aerobic environments. In some embodiments, any environment may independently function irrespective of the environment present in one or more adjacent environments despite the lack of any physical barriers being present between those environments. By way of example, in some embodiments, environments 10A, 10B, and 10C may be providing aerobic environments while at that same time environments 10A', 10B', and 10C' may be providing anoxic environments.

In some embodiments, which may be applied to any of the systems shown in the appended figures, mixing devices 26 may be activated and aerators 28 activated in a portion or all of an aerobic environment, with aerators 28 operating at a lower capacity, requiring mixing devices 26 to keep the solids in suspension.

Although the foregoing description has been provided in the context of activated sludge processes, other types of wastewater treatment and other applications unrelated to wastewater are within the scope the present invention. As such, the foregoing description of illustrative embodiments of the invention has been presented only for the purpose of illustration and description and is not intended to be exhaustive or to limit the invention to the precise forms disclosed. Numerous modifications and adaptations thereof will be apparent to those of ordinary skill in the art without departing from the scope of the present invention.

We claim:

1. A system for a treatment process of wastewater comprising: a reactor system comprising one or more reactors, a plurality of sub-volumes within the reactor system having at least one of (i) one or more mixing devices, and (ii) one or more of aerators wherein at least one of the plurality of sub-volumes constitutes a flexible environment configured to dynamically transition some or all of that sub-volume between two or more of anaerobic, anoxic, fermentation, suboxic, and aerobic environments, and wherein the flexible environment comprises (i) the one or more mixing devices and (ii) the one or more aerators, wherein the mixing devices and the aerators in the flexible environment are arranged in an overlapping proximity to permit providing coinciding mixing and aeration, respectively, to the wastewater within the flexible environment, and one or more controllers for controlling the mixing devices and the aerators, wherein the one or more controllers are configured for selectively and independently controlling the one or more mixing devices within the flexible environment and for selectively and independently controlling the one or more aerators within the flexible environment.

2. The system of claim 1 wherein the one or more controllers are configured to transition the flexible environment from one environment to another environment by (i) selective activation and deactivation of one or more mixing devices within the flexible environment of the reactor system independent of activation and deactivation of mixing devices positioned within other sub-volumes of the reactor system and (ii) selective activation and deactivation of one or more aerators positioned within the flexible environment of the reactor system independent of aerators positioned within other sub-volumes of the reactor system.

3. The system of claim 1 wherein the one or more controllers are configured to activate or deactivate aerators in the flexible environment based upon one or more of aerobic solids retention time, total solids retention time, and mean cell residence time necessary to maintain complete nitrification based upon water temperature.

4. The system of claim 1 wherein the one or more controllers are configured to provide an anoxic environment to the wastewater in the flexible environment based upon one or more of the total nitrogen, nitrate, total phosphorus, orthophosphorus, and ammonia effluent requirements of the wastewater based upon water temperature.

5. The system of claim 1 wherein the one or more controllers are configured to provide an environment in the sub-volume of wastewater in the flexible environment based upon one or more of influent flow rate and influent load.

6. The system of claim 1 wherein the one or more controllers are configured to provide an environment in the sub-volume of wastewater in the flexible environment based upon one or more of time of day, time of year, diurnal flow/load fluctuations, weekly flow/load fluctuations, monthly flow/load fluctuations, annual flow/load fluctuations, seasonal flow/load fluctuations, initial start-up versus design flow/load fluctuations, and combinations thereof.

7. The system of claim 1 wherein the one or more controllers are configured to provide an environment in the flexible environment that is a same environment as at least one adjacent sub-volume in the reactor system.

8. The system of claim 1 wherein the flexible environment is capable of providing a plurality of flexible sub-environments.

9. The system of claim 1 wherein a first volume of the flexible environment has a first flexible sub-environment, and a second volume of the flexible environment has a second flexible sub-environment, wherein the first flexible sub-environment and the second flexible sub-environment are distinct.

10. The system of claim 1 wherein the one or more mixing devices are configured to provide vertical mixing.

11. The system of claim 1 wherein the flexible environment is not bounded by any internal physical barriers.

12. The system of claim 1 wherein the reactor system does not comprise any internal physical barriers within the flexible environment.

13. The system of claim 1 comprising a plurality of flexible environments.

14. The system of claim 1 wherein sub-volumes that do not constitute a flexible environment each have an environment independently selected from the group consisting of an anaerobic, anoxic, fermentation, suboxic, and aerobic environment.

15. The system of claim 1 further comprising alternative internal recycle source locations and discharge locations wherein the one or more controllers is configured to activate and deactivate one or more of an internal recycle source and a discharge location.

16. A control system for wastewater treatment systems comprising a plurality of environments within a reactor system, the system comprising: one or more controllers configured to independently and selectively control a first set of mixing devices positioned within a flexible environment of the reactor system and to independently and selectively control a first set of aerators positioned in overlapping proximity to permit providing coinciding mixing and aeration, respectively, with the first set of mixing devices within flexible environment so as to provide a first environment within at least a portion of the flexible environment wherein the first environment is a fermentation, suboxic, aerobic, anoxic, or anaerobic environment, wherein the one or more controllers is further configured to independently and selectively control the first set of mixing devices and to independently and selectively control the first set of aerators so as to dynamically transition at least a portion of the flexible environment from the first environment to a distinct second environment, wherein the distinct second environment is a fermentation, suboxic, aerobic, anoxic, or anaerobic environment, and wherein the one or more controllers is further configured to control one or more additional sets of mixing devices or one or more additional sets of aerators positioned within one or more additional sub-volumes of wastewater, wherein the one or more controller is configured to control such additional sets of mixing devices and additional sets of aerators separately from the first set of mixing devices and the first set of aerators to provide one or more fermentation, suboxic, aerobic, anoxic, or anaerobic environments within the one or more additional sub-volumes.

17. The control system of claim 16 wherein the one or more controllers is configured to control the first set of mixing devices and the first set of aerators so as to dynamically transition a portion of the flexible environment from the first environment to the distinct second environment, wherein the distinct second environment is a fermentation, suboxic, aerobic, anoxic, or anaerobic environment, and wherein the one or more controllers is further configured to control the location or locations to which internal recycle is introduced into a reactor of the reactor system, and wherein the activation, deactivation, and control of the locations are based upon one or more of an aerobic solids retention time; total solids retention time; mean cell residence time necessary to maintain complete nitrification based upon water temperature; nitrogen, nitrate, phosphorus, orthophosphorus, and/or ammonia effluent requirements of the wastewater based upon water temperature; influent flow rate, influent load or time of day or time of year; diurnal flow/load fluctuations, weekly flow/load fluctuations, monthly flow/load fluctuations, annual flow/load fluctuations, seasonal flow/load fluctuations, or initial start-up versus design flow/load fluctuations; and combinations thereof.

18. The control system of claim 16 wherein the controller is configured to control the first set of mixing devices and the first set of aerators so as to provide the first environment to a first portion of the flexible environment and to provide a distinct other environment to a second portion of the flexible environment, wherein the first environment and the distinct other environment are each selected independently from the group consisting of a fermentation, suboxic, aerobic, anoxic, or anaerobic environment.

19. A method for treating wastewater within a reactor system containing a volume of the wastewater wherein the reactor system includes a first set of a plurality of mixing devices and a first set of a plurality of aerators, the method comprising: independently and selectively controlling a first set of the plurality mixing devices positioned within a first sub-volume of wastewater in the reactor system, independently and selectively controlling a first set of the plurality of aerators positioned in overlapping proximity with the first set of the plurality of mixing devices within the first sub-volume of wastewater in the reactor system to permit providing coinciding mixing and aeration, respectively, to the wastewater within the flexible environment, wherein the independent and selective control of the first set of the plurality mixing devices and the first set of the plurality of aerators disposed within the first sub-volume of wastewater in the reactor system is independent of any activation or deactivation of the first set of the plurality of mixing devices and the plurality of aerators positioned within other sub-volumes of the reactor system, wherein one or more of the first set of mixing devices and the first set of aerators are independently and selectively controlled to provide a dynamic transition of an environment of the flexible environment from a fermentation, suboxic, aerobic, anoxic, or anaerobic environments to a distinct environment selected from one the group consisting of a fermentation, suboxic, aerobic, anoxic, and anaerobic environments.

20. The method of claim 19 further comprising the step of controlling one or more of an internal recycle source location and an internal recycle discharge location or locations, wherein the activation, deactivation, and control of the location or locations are in response to one or more of an aerobic solids retention time; total solids retention time; mean cell residence time necessary to maintain complete nitrification based upon water temperature; nitrogen, nitrate, phosphorus, orthophosphorus, and/or ammonia effluent requirements of the wastewater based upon water temperature; influent flow rate, influent load or time of day or time of year; diurnal flow/load fluctuations, weekly flow/load fluctuations, monthly flow/load fluctuations, annual flow/load fluctuations, seasonal flow/load fluctuations, and/or initial start-up versus design flow/load fluctuations; and combinations thereof.

* * * * *